United States Patent
Gage et al.

(10) Patent No.: US 10,760,609 B2
(45) Date of Patent: Sep. 1, 2020

(54) SEALANT ARTICLES AND METHOD OF APPLYING SEALANT

(71) Applicant: HAMILTON SUNDSTRAND CORPORATION, Windsor Locks, CT (US)

(72) Inventors: Marc E. Gage, Feeding Hills, MA (US); David J. Grulke, Tolland, CT (US); Michael E. Folsom, Ellington, CT (US); Blair A. Smith, South Windsor, CT (US); Mark S. Busha, East Longmeadow, MA (US); Kerry L. Davis, Enfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 298 days.

(21) Appl. No.: 15/018,076

(22) Filed: Feb. 8, 2016

(65) Prior Publication Data
US 2017/0227041 A1  Aug. 10, 2017

(51) Int. Cl.
*F16B 11/00* (2006.01)
*F16B 19/00* (2006.01)
(Continued)

(52) U.S. Cl.
CPC ............ *F16B 33/004* (2013.01); *B29C 65/02* (2013.01); *B29C 65/48* (2013.01); *F16B 19/008* (2013.01);
(Continued)

(58) Field of Classification Search
CPC .... F16B 11/006; F16B 11/008; F16B 33/004; F16B 19/008; F16B 39/225; F16B 33/008; F16B 33/06; F16B 43/001; B29C 65/48; B29C 65/483; B29C 65/4835; B29C 65/484; B29C 65/62; B29C 65/561;
(Continued)

(56) References Cited

U.S. PATENT DOCUMENTS

| 3,469,490 A | * | 9/1969 | Pearce, Jr. | ............ F16B 33/004 411/371.1 |
| 3,827,204 A | * | 8/1974 | Walters | ................. E04B 1/6801 52/396.04 |

(Continued)

FOREIGN PATENT DOCUMENTS

| WO | 2014172302 A1 | 10/2014 | |
| WO | WO-2014172302 A1 * | 10/2014 | ............. B64D 45/02 |

OTHER PUBLICATIONS

3M Corporation, Scotch-Weld Structural Adhesive Film AF 126-2 • AF 126-3, Dec. 2009, p. 11.*
(Continued)

*Primary Examiner* — Philip C Tucker
*Assistant Examiner* — Brian R Slawski
(74) *Attorney, Agent, or Firm* — Cantor Colburn LLP

(57) ABSTRACT

A method of making an assembly is disclosed. According to the method, a curable sealant is applied to a metal surface of a first article, and the curable sealant and first article are stored under conditions to maintain the curable sealant in an at least partially uncured state. The method further includes contacting the curable sealant on the first article metal surface with an electrically conductive surface of a second article, and curing the curable sealant.

19 Claims, 3 Drawing Sheets

(51) Int. Cl.

| | |
|---|---|
| *F16B 33/00* | (2006.01) |
| *F16B 33/06* | (2006.01) |
| *F16B 43/00* | (2006.01) |
| *B29C 65/48* | (2006.01) |
| *B29C 65/56* | (2006.01) |
| *B29C 65/72* | (2006.01) |
| *B29C 65/00* | (2006.01) |
| *B32B 15/08* | (2006.01) |
| *B32B 37/00* | (2006.01) |
| *B29C 65/02* | (2006.01) |
| *F16B 39/22* | (2006.01) |
| *B29L 31/00* | (2006.01) |

(52) U.S. Cl.
CPC .......... *F16B 43/001* (2013.01); *B29C 65/484* (2013.01); *B29C 65/4835* (2013.01); *B29C 65/561* (2013.01); *B29C 65/72* (2013.01); *B29C 66/0244* (2013.01); *B29C 66/712* (2013.01); *B29C 66/7422* (2013.01); *B29C 66/9141* (2013.01); *B29L 2031/727* (2013.01); *B32B 15/08* (2013.01); *F16B 11/006* (2013.01); *F16B 33/008* (2013.01); *F16B 33/06* (2013.01); *F16B 39/225* (2013.01)

(58) Field of Classification Search
CPC ..... B29C 65/562; B29C 65/60; B29C 65/601; B29C 65/72; B29C 66/0244; B29C 66/50; B29C 66/9141; B29C 66/91411; B29C 66/91441; B29C 66/91443; B29C 66/91445; B29C 66/712; B29C 66/742; B29C 66/7422; Y10T 29/49885; Y10S 411/914; B32B 15/08; B32B 15/092; B32B 15/095
USPC ......... 156/60, 66, 80, 91, 92, 293, 295, 325, 156/326, 327, 329, 330, 331.7, 307.5; 29/428, 458; 411/82, 82.2, 82.3, 914
See application file for complete search history.

(56) References Cited

U.S. PATENT DOCUMENTS

| | | | | |
|---|---|---|---|---|
| 3,897,222 | A * | 7/1975 | Hood | B23Q 1/70 427/384 |
| 4,164,971 | A * | 8/1979 | Strand | F16B 33/06 156/330 |
| 4,866,108 | A * | 9/1989 | Vachon | C08G 59/226 523/428 |
| 5,167,480 | A * | 12/1992 | Gilman | B21C 23/008 411/500 |
| 5,260,100 | A | 11/1993 | Day | |
| 5,264,285 | A * | 11/1993 | Dougherty | C08L 83/14 428/427 |
| 5,983,478 | A | 11/1999 | Dolan | |
| 7,363,945 | B2 | 4/2008 | Saha | |
| 2002/0127083 | A1* | 9/2002 | Ando | B05D 7/16 411/378 |
| 2002/0170669 | A1* | 11/2002 | Autterson | C09J 7/35 156/307.7 |
| 2003/0098546 | A1* | 5/2003 | Beyssac | B65D 75/327 277/300 |
| 2005/0148741 | A1* | 7/2005 | Zook | C09J 7/00 525/535 |
| 2011/0297317 | A1* | 12/2011 | Lutz | C09J 163/00 156/330 |
| 2012/0168055 | A1* | 7/2012 | Bray | F16B 1/0071 156/64 |
| 2012/0260490 | A1* | 10/2012 | Sakoda | F16B 19/1045 29/525.06 |
| 2014/0130957 | A1* | 5/2014 | Verdier | F16B 39/225 156/91 |
| 2014/0326332 | A1* | 11/2014 | Pasco | E03F 5/22 137/364 |
| 2016/0068274 | A1* | 3/2016 | Zook | B64D 45/02 16/108 |

OTHER PUBLICATIONS

Search Report regarding related EP App. No. 17154745.8; dated May 24, 2017; 8 pgs.
Chinese Office Action Issued in Chinese Application No. 201710069625.7 dated Nov. 20, 2019; 8 Pages.

* cited by examiner

SEALANT ARTICLES AND METHOD OF APPLYING SEALANT

BACKGROUND

This disclosure is related to sealants, techniques for applying sealants, and sealant articles.

Sealants are widely used for a variety of applications. For example, sealants can be used to provide a seal between articles against penetration of outside materials such as liquids, gases, or solids. Sealants are often used in conjunction with fasteners used to connect articles together. For example, sealant is often applied to threaded connectors such as screws or bolts to provide a bond between male and female threaded members to inhibit loosening of the threaded connector that can be caused by vibration or impact. In some cases, articles comprising different metal compositions are joined together, such as an aluminum structural component and a stainless steel fastener. When the different metal compositions (or a metal composition and a non-metallic electrically conductive material (e.g., carbon)) have different electrode potentials (i.e., one metal is more noble than another metal), the presence of water between the articles can act as an electrolyte and promote an electrochemical reaction leading to galvanic corrosion. In such cases a sealant between the articles of different electrode potential can be used to help protect against galvanic corrosion by resisting penetration of water between the articles.

Sealants can be applied to articles by various techniques, including brush application or various types of injection techniques. In many cases, the sealant is a curable composition that is applied in a liquid or flowable state, followed by curing to a solid or hardened state. Many sealants such as two-component reactive sealants, or sealants having a chemical curing reaction initiated by exposure to oxygen or atmospheric moisture have a limited time period after application before the cure reaction is complete. This often necessitates application of the sealant at the time of or shortly before assembly of the article(s) to be sealed. Even sealants that undergo a curing reaction whose initiation can be controlled, e.g., by later application of heat or radiation, can have a limited time period during which they maintain flow characteristics sufficient to allow for compression of the sealant between the articles being sealed in order to provide a tight contiguous seal bond.

BRIEF DESCRIPTION

In some embodiments of this disclosure, a method of making an assembly comprises applying a curable sealant to a metal surface of a first article, and storing the curable sealant and first article under conditions to maintain the curable sealant in an at least partially uncured state. The method further comprises contacting the curable sealant on the first article metal surface with an electrically conductive surface of a second article, and curing the curable sealant.

In some embodiments of the disclosure, an article comprises a metal surface and a curable sealant on the metal surface, disposed in a storage environment to maintain the curable sealant in an at least partially uncured state.

BRIEF DESCRIPTION OF THE DRAWINGS

Subject matter of this disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
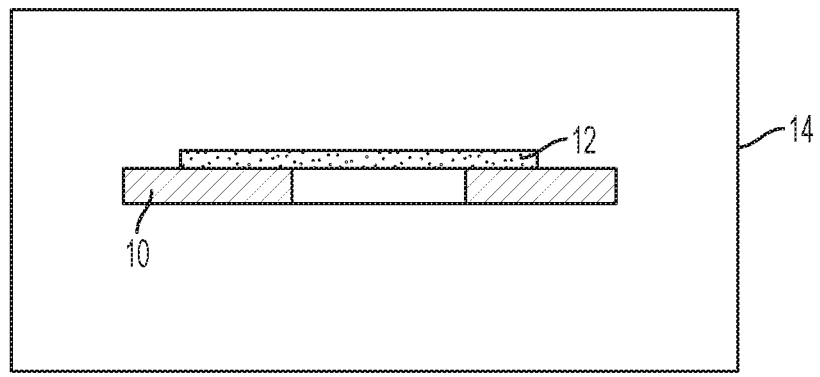
FIG. 1 is a schematic depiction of a cross-section view of an article having an applied curable sealant thereon.

Various types of sealants can be used in accordance with this disclosure. Virtually any sealant can be used that has a curing mechanism that can be subjected to storage conditions under which curing of the sealant is inhibited or stopped such that the curable sealant is maintained in an at least partially uncured state. Examples of sealants include, but are not limited to epoxy sealants, polysulfide sealants, polythioether sealants, polyurethane sealants, polysiloxane sealants (including but not limited to RTV sealant). In some embodiments (e.g., for aerospace applications), the sealant can be an epoxy sealant or a polysulfide sealant. In some embodiments, the sealant can comprise two or more reactive components that undergo a cure reaction upon mixing unless subjected to conditions to inhibit or stop the cure reaction. Such sealants are sometimes referred to as two-part sealants or two-component sealants. For example two-part epoxy sealants can comprise an epoxy resin that is the reaction product of an epoxide (e.g., epichlorohydrin) and a diol (e.g., bisphenol A, aliphatic polyol), and an amine or anhydride curing agent that react to form a cured sealant. Polysulfides can utilize mercapto-terminated polysulfide polymers that undergo curing by oxidation of the terminal mercaptan groups to form extended disulfide bonds, and include oxidizing agents such as manganese dioxide as curing agents to promote the oxidation-based cure reaction. Polythioether sealants can utilize mercaptan-terminated polythioethers that undergo chain oxide-promoted chain extension curing similar to the polysulfides. Polyurethanes can utilize a polyol and a low molecular weight polyisocyanate that can spontaneously react to form urethane group linkages. Higher molecular weight isocyanate-terminated prepolymers can be utilized for a cure reaction that utilizes ambient moisture as a curing agent. RTV silicone utilizes a polysiloxane that has a cure reaction promoted by a metal catalyst such as dibutyltin dilaurate.

As mentioned above, in some embodiments of this disclosure a curable sealant is applied to a metal surface and is stored under conditions to maintain the curable sealant in an at least partially uncured state. This can be accomplished by various techniques. In some embodiments, the storage conditions to maintain the curable sealant in an at least partially uncured state involve reducing the temperature. Although the disclosure does not depend on and is not bound by any particular theory of operation, in some embodiments a reduced temperature can affect the molecular reaction kinetics by reducing available activation energy needed for the cure reaction, and can also have a cure reaction suppression effect at the macro level by solidifying (i.e., 'freezing') an otherwise fluid mixture of reactants to prevent further intermixing of the reactants. In some embodiments, the article and applied curable sealant are stored at a temperature in a range having a maximum of 0° C., more specifically −25° C., and even more specifically −50° C., and a minimum of −100° C., more specifically −75° C. These range endpoints can be independently combined to yield various ranges.

In some embodiments, the storage conditions to maintain the sealant in an at least partially uncured state can be conditions that deprive the sealant of a chemical component needed for the cure reaction. In some embodiments, the storage conditions can provide an oxygen-free or reduced oxygen environment to maintain the curable sealant in an at least partially uncured state. This can be accomplished, for example, with a storage environment under vacuum or with a sealed storage environment under a non-oxygen atmosphere such as nitrogen. In some embodiments, the storage conditions can provide a moisture-free or reduced moisture environment to maintain the curable sealant in an at least partially uncured state. This can be accomplished, for example, with a sealed storage environment under vacuum or with a storage environment under a climate controlled de-humidified atmosphere provided, for example, by a climate control system or desiccant. Combinations of conditions can also be used, such as reduced temperature and reduced oxygen, reduced temperature and reduced moisture, or reduced moisture and reduced oxygen.

With reference now to the Figures, FIG. 1 depicts an example of a stored fastener component having applied curable sealant. As shown in FIG. 1, a washer 10 has a bead layer of applied curable sealant 12. Of course, many other types of articles can have applied curable sealant, including fastener component surfaces (e.g., a washer face, a nut face, a wiring lug face, a bushing face, a bolt or screw head face, a nutplate face, a bolt or screw shaft or threads, a spacer, a pin (e.g., cotter pin, dowel pin), a rivet or other surfaces (e.g., structural components to be joined such as panels, support brackets). The curable sealant 12 can be applied by various techniques, including but not limited to brush application, spray application, roller application, injection nozzle dispensing (e.g., dispensing a bead of curable sealant onto the article), or printing techniques (e.g., screen printing). The amount and thickness of the layer of applied curable sealant can vary according to the application. In some embodiments, the curable sealant can be applied to the entirety of the surface to be sealed. In some embodiments, as exemplified in FIG. 1, the curable sealant can be applied to a portion of the surface to be sealed. In some embodiments, the curable sealant can be applied to a portion of the surface to be sealed, with the intention of spreading the sealant onto additional portion(s) of the surface during the assembly process. As further depicted in FIG. 1, the washer 10 with applied curable sealant 12 is placed into a storage environment 14 under conditions to maintain the curable sealant in an at least partially uncured state.

Although FIG. 1 depicts only a single washer 10, in some embodiments, curable sealant can be applied to multiple articles in a continuous process (i.e., assembly line) or a batch process. In some embodiments, a plurality of articles (e.g., fastener components such as washers, nuts, wiring lugs, bushings, bolts, or screws) can be disposed on a support (not shown) such as a plate or tray structure, optionally on component retaining features such as spindles or recesses matching the shape of the component(s), and sealant applied to the batch of the plurality of articles. The support carrying the plurality of articles can then be placed into storage under conditions to maintain the curable sealant in an at least partially cured state, or the articles can be removed from the support and placed in the storage conditions. In some embodiments where reduced temperature is used, the support carrying the articles with applied curable sealant can be placed into reduced temperature conditions to solidify or stabilize the curable sealant, and then the articles can be removed from the support and returned to cold storage.

Figure 2:
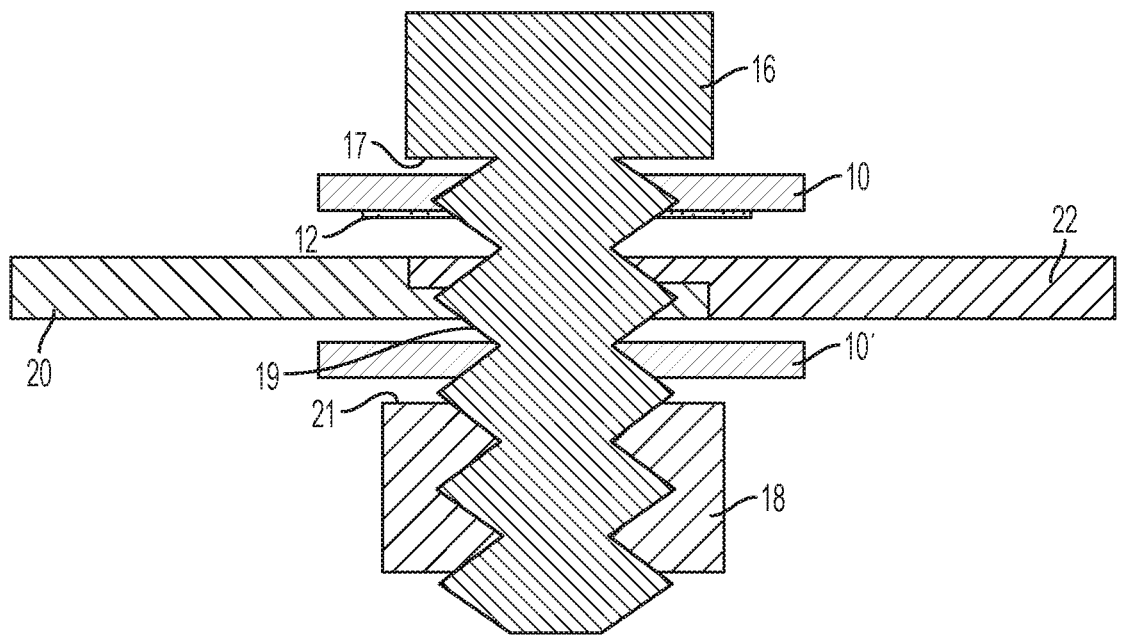
FIG. 2 is a schematic depiction of a cross-section view of a partially-assembled assembly including the article of FIG. 1.
Figure 3:
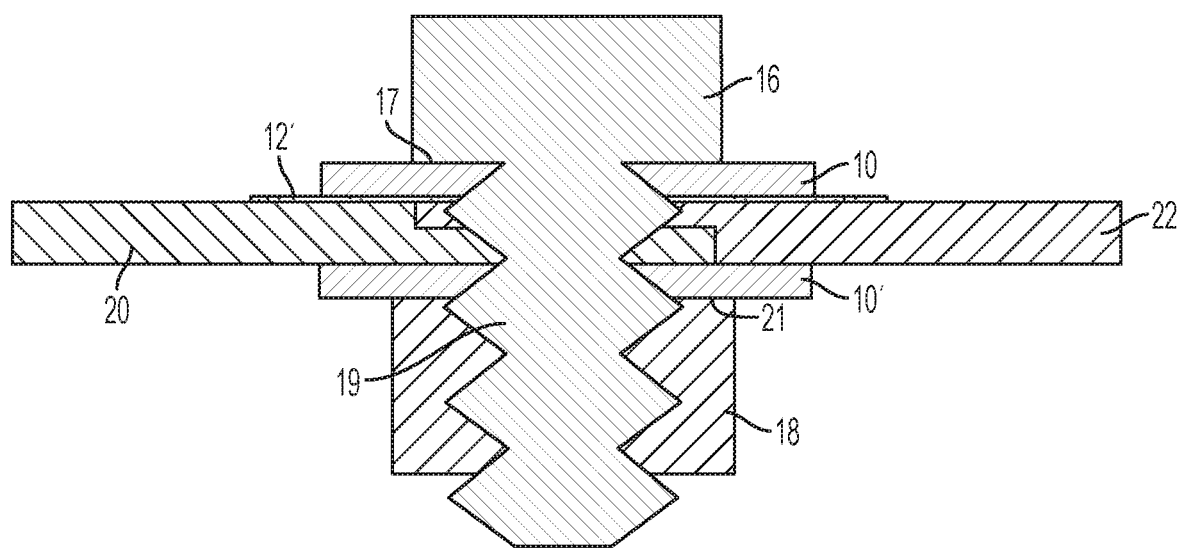
FIG. 3 is a schematic depiction of a cross-section view of the assembly of FIG. 2 fully assembled.

With reference now to FIGS. 2 and 3, the washer 10 is removed from the storage environment 14 and assembled with a bolt 16, a nut 18, and a second washer 10' to secure panels 20 and 22 together before the curable sealant can fully cure. FIG. 2 depicts the assembly in a partially-assembled state before tightening of the nut 18 and bolt 16. FIG. 3 depicts the assembly in a fully assembled state after tightening of the nut 18 and bolt 16. As illustrated in FIG. 3, tightening of the nut 18 and bolt 16 compresses the bead layer of curable sealant 12 between the washer 10 and the panels 20/22, displacing a portion of the curable sealant from the space between the washer 10 and panels 20/22 to form a thin layer of curable sealant 12'. In some embodiments, for example, where the curable sealant has been solidified (i.e., frozen) from storage under reduced temperature, the curable sealant can be heated or allowed to warm up from exposure to ambient temperatures prior to assembly in order to provide flowability for compression and spreading of the curable sealant. In some embodiments, pressure applied during assembly can be sufficient to provide flowability without the need for warming of the curable sealant. After assembly, having been removed from conditions of the storage environment 14 under which the curable sealant was maintained in at least partially uncured state, the curable sealant of the assembly of FIG. 3 can complete the curing reaction to form a permanent seal.

FIGS. 2 and 3 depict curable sealant disposed between the washer 10 and the panels 20/22. In some embodiments, the curable sealant is utilized to provide a seal between metals of dissimilar nobility (i.e., electrode potentials) or a metal and an electrically conductive material of different electrode potentials to resist penetration of moisture to help protect against galvanic corrosion. Additionally, in some embodiments, the curable sealant can also provide an electrically non-conductive barrier between metals of dissimilar nobility (or a metal and another electrically conductive material, e.g., carbon) to further protect against galvanic corrosion. For example, the curable sealant can provide a seal or a barrier between stainless steel fastener components such as washer 10 and aluminum panels such as panels 20/22. Of course, the potential for galvanic corrosion and the benefits of protecting against it are not limited to combinations of stainless steel and aluminum. Other combinations where curable sealants can be utilized to help protection against galvanic corrosion include, but are not limited to, stainless steel and magnesium, titanium and magnesium, aluminum and low carbon steel, aluminum and carbon reinforced composites, nickel and aluminum, magnesium and low carbon steel, gold and nickel, or gold and copper. The placement of the curable sealant in FIGS. 2 and 3 between the washer 10 and the panels 20/22 is of course exemplary in nature, and sealant can be disposed at other locations as is known in the art. For example, where the side of panels 20/22 having washer 10 is an exterior surface and the opposite side is an interior surface, sealant between the washer 10 and the panels 20/22 may be sufficient to prevent penetration of moisture between the panels 20/22 and any of the fastener components. However, if both sides of the panels 20/22 are exposed to the elements, sealant can also be placed between the washer 10' and the panels 20/22. Sealant can also be disposed at other locations, including but not limited to the bolt face 17, the bolt threads 19, the nut face 21, or between panels 20 and 22.

Figure 4:
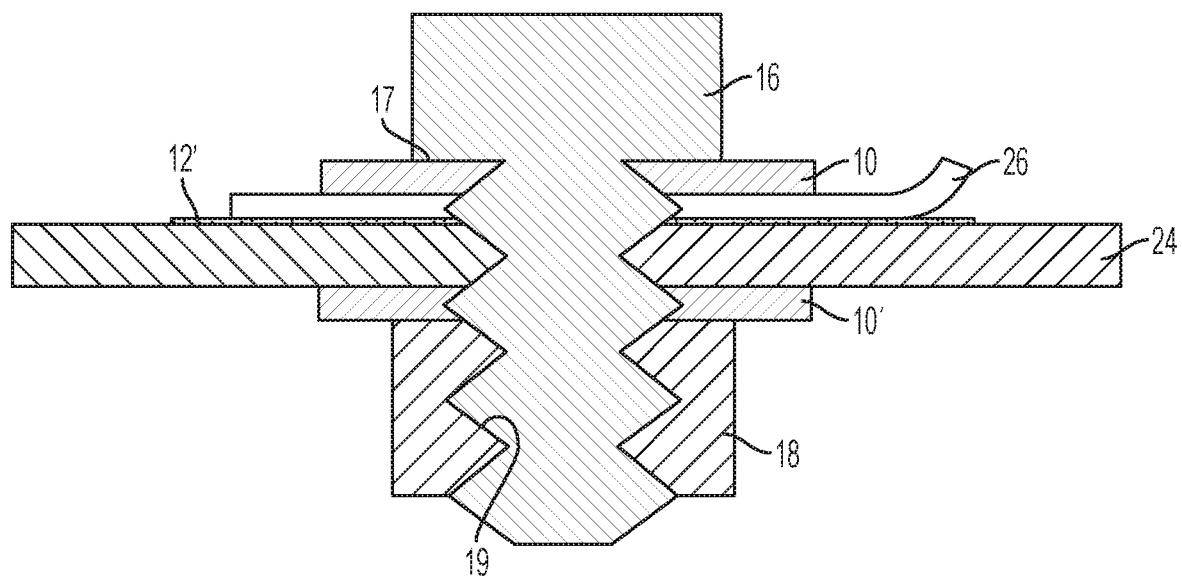
FIG. 4 is a schematic depiction of a cross-section view of another assembly.

Of course, the nut and bolt assembly of FIGS. 2 and 3 is exemplary in nature for purposes of illustration, and many other assembly configurations are contemplated. Another illustrative example is depicted in FIG. 4, which uses the same numbering as FIGS. 2 and 3 to describe the same or similar components, which are not described in further detail here. As shown in FIG. 4, a bolt 16, nut 18, and washers 10/10' are used to secure an electrical wiring lug 26 (e.g., a nickel-plated copper electrical wiring lug) to a panel or housing 24 (e.g., an aluminum housing), with a layer of curable sealant 12' providing a seal between the lug 26 and the panel or housing 24. Such wiring lugs can be used, for example, to connect electrical components to a common electrical plane (e.g., a ground or neutral voltage). There are of course many other configurations that can utilize curable sealant, the specific details of which do not require further explanation herein.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A method of making an assembly, comprising
applying a fluid curable sealant to a metal surface of a first article;
disposing the first article within an external storage environment under conditions to maintain the curable sealant in a solidified at least partially uncured state;
removing the first article from the external storage environment;
returning the curable sealant on the metal surface of the removed first article to a fluid state, and compressing the fluid curable sealant between the first article metal surface and an electrically conductive surface of a second article to displace a portion of the fluid curable sealant out of a space between the first article metal surface and the second article electrically conductive surface; and
curing the curable sealant, wherein the first article metal surface and second article electrically conductive surface have different electrode potentials.

2. The method of claim 1, wherein the external storage environment is maintained at a temperature below a curing temperature of the curable sealant to maintain the curable sealant in an at least partially uncured state.

3. The method of claim 2, wherein the external storage environment is maintained at a temperature less than or equal to 0° C.

4. The method of claim 2, wherein the external storage environment is maintained at a temperature less than or equal to −25° C.

5. The method of claim 1, wherein the external storage environment maintains an oxygen-free or reduced oxygen environment.

6. The method of claim 1, wherein the external storage environment maintains a moisture-free or reduced moisture environment.

7. The method of claim 1, wherein the entirety of the space between the first article metal surface and the second article electrically conductive surface is occupied by the curable sealant subsequent to compressing the curable sealant.

8. The method of claim 1, further comprising storing the first article at a temperature below a solidification temperature of the fluid curable sealant to maintain the curable sealant in an at least partially uncured state, and raising the temperature to a temperature sufficient to allow flow of the curable sealant before compressing the curable sealant.

9. The method of claim 1, wherein the first article comprises a fastener component.

10. The method of claim 9, wherein the first article metal surface comprises a washer face, a nut face, a wiring lug face, a bushing face, a bolt or screw head face, a nutplate face, a bolt or screw shaft or threads, a spacer, a pin, a rivet, a panel, or a support bracket.

11. The method of claim 9, wherein the second article comprises a panel component.

12. The method of claim 1, wherein the different electrode potentials are provided by pairings selected from stainless steel and aluminum, stainless steel and magnesium, titanium and magnesium, aluminum and low carbon steel, aluminum and carbon reinforced composites, nickel and aluminum, magnesium and low carbon steel, gold and nickel, or gold and copper.

13. The method of claim 1, wherein the fluid curable sealant comprises a curable polysulfide sealant, a curable epoxy sealant, a curable polyurethane sealant, or a curable silicone sealant.

14. The method of claim 1, further comprising disposing the first article onto a support along with one or more other articles comprising a metal surface, applying the fluid curable sealant to the metal surface of the first article and the one or more other articles on the support, and introducing the support to the external storage environment.

15. The method of claim 1, wherein maintaining the curable sealant in a solidified state prevents intermixing of reactants in the curable sealant.

16. A method of making an assembly, comprising:
disposing a plurality of first articles on a support;
applying a curable sealant to metal surfaces on the plurality of first articles on the support;
disposing the plurality of first articles in an external storage environment under conditions to maintain the curable sealant on the plurality of first articles in an at least partially uncured state;
removing a first article of the plurality of first articles from the external storage environment; and
contacting the curable sealant on the metal surface of the removed first article with an electrically conductive surface of a second article; and
curing the curable sealant wherein the first article metal surfaces and second article electrically conductive surface have different electrode potentials.

17. The method of claim 16, further comprising placing the support and the plurality of first articles with the curable sealant into the external storage environment.

18. The method of claim 17, further comprising returning the support and first articles to the external storage environment after removing the first article of the plurality of first articles from the external storage environment.

19. The method of claim 16, wherein the support includes retaining features configured to match a shape of the first articles.

* * * * *